(12) United States Patent
Jimichi et al.

(10) Patent No.: US 9,780,685 B2
(45) Date of Patent: Oct. 3, 2017

(54) ELECTRICAL POWER CONVERTER WITH A CONVERTER CELL SERIES UNIT

(71) Applicants: Mitsubishi Electric Corporation, Chiyoda-ku (JP); Toshiba Mitsubishi—Electric Industrial Systems Corporation, Chuo-ku (JP)

(72) Inventors: Takushi Jimichi, Chiyoda-ku (JP); Kimiyuki Koyanagi, Chiyoda-ku (JP); Satoshi Azuma, Chiyoda-ku (JP); Sadao Funahashi, Chuo-ku (JP); Shinzo Tamai, Chuo-ku (JP); Yasuhiko Hosokawa, Chuo-ku (JP); Kotaro Higashi, Chuo-ku (JP)

(73) Assignees: Mitsubishi Electric Corporation, Chiyoda-ku (JP); Toshiba Mitsubishi-Electric Industrial Systems Corporation, Chuo-ku (JP)

( * ) Notice: Subject to any disclaimer, the term of this patent is extended or adjusted under 35 U.S.C. 154(b) by 12 days.

(21) Appl. No.: 14/412,524

(22) PCT Filed: Jul. 2, 2013

(86) PCT No.: PCT/JP2013/068175
§ 371 (c)(1),
(2) Date: Jan. 2, 2015

(87) PCT Pub. No.: WO2014/010474
PCT Pub. Date: Jan. 16, 2014

(65) Prior Publication Data
US 2015/0188447 A1    Jul. 2, 2015

(30) Foreign Application Priority Data
Jul. 11, 2012 (JP) .................................. 2012-155117

(51) Int. Cl.
H02M 7/483 (2007.01)
H02M 7/04 (2006.01)
(Continued)

(52) U.S. Cl.
CPC ............... *H02M 7/04* (2013.01); *H02M 7/19* (2013.01); *H02M 7/44* (2013.01); *H02M 7/483* (2013.01);
(Continued)

(58) Field of Classification Search
CPC ............ H02M 7/04; H02M 7/42; H02M 7/44; H02M 2007/4835; H02M 7/48;
(Continued)

(56) References Cited

U.S. PATENT DOCUMENTS

| 4,758,939 A | 7/1988 | Matsuo et al. |
| 2010/0066174 A1* | 3/2010 | Dommaschk ........... H02M 1/32 307/75 |

(Continued)

FOREIGN PATENT DOCUMENTS

| JP | 4 325872 | 11/1992 |
| JP | 2010 512135 | 4/2010 |

(Continued)

OTHER PUBLICATIONS

Lesnicar, A. et al., "An Innovative Modular Multilevel Converter Topology Suitable for a Wide Power Range", IEEE Bologna, vol. 3, Total 6 pages, (2003).

(Continued)

*Primary Examiner* — Timothy J Dole
*Assistant Examiner* — Ivan Laboy Andino
(74) *Attorney, Agent, or Firm* — Oblon, McClelland, Maier & Neustadt, L.L.P.

(57) ABSTRACT

An electrical power converter includes: AC voltage terminals U, V, and W; DC voltage terminals P and N; a converter (Continued)

cell series unit composed of one or more converter cells connected in series between the AC voltage terminals U, V, and W and the DC voltage terminals P and N, each converter cell including a semiconductor element and a capacitor; and a first inductance connected in series to the converter cell series unit, between, of the DC voltage terminals P and N, a DC voltage terminal at the lowest potential with respect to the ground, and the AC voltage terminals U, V, and W.

8 Claims, 17 Drawing Sheets

(51) Int. Cl.
    *H02M 7/44* (2006.01)
    *H02M 7/19* (2006.01)
    *H02M 1/00* (2006.01)
    *H02M 7/48* (2007.01)

(52) U.S. Cl.
    CPC ............. *H02M 2001/0074* (2013.01); *H02M 2007/4822* (2013.01); *H02M 2007/4835* (2013.01)

(58) Field of Classification Search
    CPC ........ H02M 7/483; H02M 7/49; H02M 7/493; H02M 7/003
    USPC ................ 363/15–17, 34, 35, 37–43, 50–55, 363/56.01–56.05, 57–58, 84–89, 95–98, 363/123, 125, 127, 131–132, 135–138
    See application file for complete search history.

(56) References Cited

U.S. PATENT DOCUMENTS

| | | |
|---|---|---|
| 2010/0118578 A1 | 5/2010 | Dommaschk et al. |
| 2010/0327837 A1* | 12/2010 | Tsugawa ................ H02M 1/32 323/285 |
| 2012/0170338 A1* | 7/2012 | Trainer ................ H02M 7/483 363/127 |
| 2012/0195084 A1* | 8/2012 | Norrga ................ H02M 7/483 363/127 |
| 2014/0375122 A1* | 12/2014 | Papastergiou .......... H02J 1/102 307/18 |

FOREIGN PATENT DOCUMENTS

| | | | |
|---|---|---|---|
| JP | 2011 24377 | 2/2011 | |
| SE | WO 2011000428 A1 * | 1/2011 | ............ H02M 7/483 |
| SE | WO 2012000545 A1 * | 1/2012 | ............ H02H 7/268 |
| SE | WO 2013149633 A1 * | 10/2013 | ............ H02J 1/102 |
| SE | WO 2013185825 A1 * | 12/2013 | ............ H02M 3/24 |
| WO | 2008 067785 | 6/2008 | |
| WO | WO 2008/067786 A1 | 6/2008 | |

OTHER PUBLICATIONS

Hagiwara, M. et al., "PMW Control and Experiment of Modular Multilevel Converters", IEEJ Trans. IA, vol. 128, No. 7, pp. 957-965, (2008), with English abstract.

Hagiwara, M. et al., "A Medium-Voltage Motor Drive with a Modular Multilevel PWM Inverter Part I. Experimental Verification by a 400-V, 15-kW Downscaled Model", IEEJ Trans. IA, vol. 130, No. 4, pp. 544-551, (2010), with English abstract.

International Search Report Issued Oct. 1, 2013 in PCT/JP13/068175 Filed Jul. 2, 2013.

Extended European Search Report issued Jan. 31, 2017 in Patent Application No. 13817638.3.

\* cited by examiner (a)

(b)

(a)

(b)

ELECTRICAL POWER CONVERTER WITH A CONVERTER CELL SERIES UNIT

TECHNICAL FIELD

The present invention relates to an electrical power converter for converting AC power to DC power or converting DC power to AC power.

BACKGROUND ART

As a technique for increasing the capacity of a semiconductor power converter, a multiplexed system using a transformer for converter is known. However, use of a transformer for converter may increase the weight and volume of an electrical power converter, and may cause DC biased magnetization when a system is disturbed. Therefore, there are attempts for practical use of a multilevel converter for realizing capacity increase and waveform improvement in a converter without using a transformer.

A multilevel converter is proposed which has a circuit configuration in which multiple converter cells for generating AC voltage on AC voltage terminals U, V, and W and DC voltage on DC voltage terminals P and N through ON/OFF control for a semiconductor switching element are connected in series between the AC voltage terminals U, V, and W and the DC voltage terminals P and N (for example, non-Patent Document 1).

A multilevel converter is proposed in which reactors are added between the AC voltage terminals U, V, and W and the DC voltage terminal P and between the AC voltage terminals U, V, and W and the DC voltage terminal N in the circuit configuration of the electrical power converter of non-Patent Document 1 (for example, non-Patent Document 2). Further, a multilevel converter is proposed which has reactors such that the reactor connected at the positive side and the reactor connected at the negative side are magnetically coupled with each other (for example, non-Patent Document 3).

CITATION LIST

Patent Document

Non-Patent Document 1: A. Lesnicar, R. Marquardt "An Innovative Modular Multilevel Converter Topology Suitable for a Wide Power Range", Power Tech Conference Proceedings, 2003 IEEE Bologna, Volume: 3, 2003 ([II CONCEPT OF THE NEW MODULAR MULTILEVEL CONVERTER], FIGS. 1 and 2)

Non-Patent Document 2: Makoto Hagiwara, Hirofumi Akagi, "PWM Control and Experiment of Modular Multilevel Converters (MMC)", IEEJ transactions D, vol. 128, no. 7, pp. 957-965, 2008 (page 958, FIGS. 1 and 2)

Non-Patent Document 3: Makoto Hagiwara, Kazutoshi Nishimura, Hirofumi Akagi, "A Medium-Voltage Motor Drive with a Modular Multilevel PWM Inverter, Part I: Experimental Verification by a 400-V 15-kW Downscaled Model" IEEJ transactions D, vol. 130, no. 4, pp. 544-551, 2010 (pages 545-546, FIGS. 1 and 2)

SUMMARY OF THE INVENTION

Problems to be Solved by the Invention

In the electrical power converter disclosed in non-Patent Document 1, since a reactor is not provided, an inductance component is small and DC current flowing in the converter cell cannot be controlled. On the other hand, regarding the electrical power converters disclosed in non-Patent Documents 2 and 3, their configuration in which multiple converter cells are connected in series is suitable for high-voltage usage, but a reactor is large and heavy and is placed at a high potential, and therefore high insulation voltage is required. In addition, in the case of using an insulator or the like to secure insulation, it is difficult to ensure earthquake resistance.

The present invention has been made to solve the above problems, and an object of the present invention is to provide an electrical power converter with a downsized reactor, reduced insulation voltage, and high earthquake resistance.

Solution to the Problems

A first electrical power converter according to the present invention includes: AC voltage terminals; DC voltage terminals; a converter cell series unit composed of one or more converter cells connected in series between the AC voltage terminals and the DC voltage terminals, each converter cell including a semiconductor element and a capacitor; and a first inductance connected in series to the converter cell series unit, between, of the DC voltage terminals, a DC voltage terminal at the lowest potential with respect to a ground, and the AC voltage terminals.

A second electrical power converter according to the present invention includes: first AC voltage terminals; second AC voltage terminals; a positive DC voltage terminal; a negative DC voltage terminal; a neutral point between the positive and negative DC voltage terminals; converter cell series units provided between the first AC voltage terminals and the positive DC voltage terminal, between the first AC voltage terminals and the neutral point, between the second AC voltage terminals and the neutral point, and between the second AC voltage terminals and the negative DC voltage terminal, each converter cell series unit composed of one or more converter cells connected in series, each converter cell including a semiconductor element and a capacitor; a third inductance connected in series to the converter cell series unit, between the first AC voltage terminals and the neutral point; and a fourth inductance connected in series to the converter cell series unit, between the second AC voltage terminals and the neutral point.

Effect of the Invention

Owing to the above configuration, the first electrical power converter according to the present invention makes it possible to provide an electrical power converter with a reactor downsized and with insulation voltage also reduced owing to the reactor being placed close to the ground potential, thereby facilitating insulation and having high earthquake resistance.

Owing to the above configuration, the second electrical power converter according to the present invention makes it possible to provide an electrical power converter with a reactor downsized and with insulation voltage also reduced owing to the reactor being placed close to the ground potential, thereby facilitating insulation and having high earthquake resistance.

DESCRIPTION OF EMBODIMENTS

Embodiment 1

Embodiment 1 relates to an electrical power converter in which one or more converter cells each composed of semiconductor elements and a capacitor are connected in series between three-phase AC voltage terminals and DC voltage terminals (P, N), and further, a reactor is connected in series to each converter cell series unit, between a DC voltage terminal at the lowest potential with respect to the ground, and the AC voltage terminals.

Hereinafter, the configuration and operation of the electrical power converter 1 according to embodiment 1 of the present invention will be described based on FIG. 1 which is a main circuit configuration diagram of the electrical power converter, FIG. 2 which is a circuit diagram of each converter cell, FIG. 3 which is a diagram for explaining current and voltage for one phase in the main circuit, FIGS. 4 to 7 which are main circuit configuration diagrams in other examples, and FIG. 8 which is a circuit diagram of each reactor.

Figure 1:
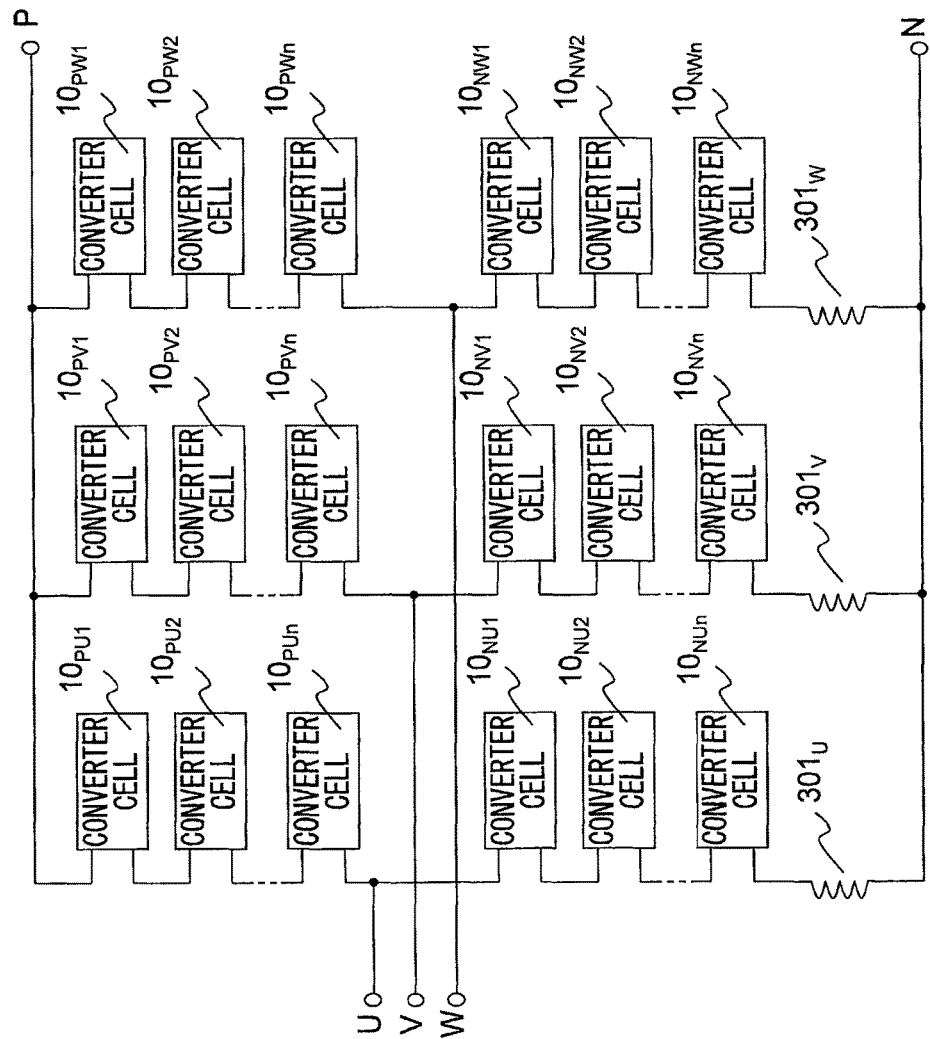
FIG. 1 is a main circuit configuration diagram according to an electrical power converter of embodiment 1 of the present invention.

FIG. 1 shows the main circuit configuration of the electrical power converter 1 of embodiment 1 of the present invention. It is noted that in the electrical power converter 1 of embodiment 1, it is assumed that the DC voltage terminal N is connected to the ground or set at a potential closer to the ground potential than the DC voltage terminal P is.

In FIG. 1, the electrical power converter 1 has the AC voltage terminals U, V, and W and the DC voltage terminals P and N, and has a converter cell series unit composed of one or more (1 to n) converter cells 10 connected in series, between each of the AC voltage terminals U, V, and W and each of the DC voltage terminals P and N. In addition, a reactor 301 is provided between each of the AC voltage terminals U, V, and W and the negative-side DC voltage terminal N. It is noted that the reactor 301 may not necessarily be a reactor, and may be replaced with an element having an inductance component (for example, a cable intentionally elongated).

In FIG. 1, for facilitating explanation and understanding, regarding the converter cells 10, for example, converter cells 10 provided between the AC voltage terminal U and the DC voltage terminal P are referred to as $10_{PU1}$, $10_{PU2}$, . . . , $10_{PUn}$, and converter cells 10 provided between the AC voltage terminal W and the DC voltage terminal N are referred to as $10_{NW1}$, $10_{NW2}$, . . . $10_{NWn}$. Hereinafter, when the converter cells are collectively mentioned, they are referred to as converter cells 10. In addition, when each converter cell series unit is mentioned, for example, a converter cell series unit composed of the converter cells $10_{PU1}$, $10_{PU2}$, . . . , $10_{PUn}$ is referred to as a converter cell series unit $10_{PU}$.

Also for the reactor 301, for example, a reactor provided between the converter cell series unit $10_{NU}$ and the DC voltage terminal N, between the AC voltage terminal U and the DC voltage terminal N, is referred to as a reactor $301_U$. Hereinafter, when the reactors $301_U$, $301_V$, and $301_W$ are collectively mentioned, they are referred to as reactors 301.

The reactor 301 corresponds to a first inductance of the present invention.

Next, the configuration and operation of each converter cell 10 will be described based on FIG. 2. It is noted that in FIG. 2, the converter cell 10 has two kinds of output methods, which are shown in FIG. 2(a) and FIG. 2(b). First, the configuration of the converter cell 10 will be described.

The converter cell 10 is composed of semiconductor switching elements 51 and 52 connected in series, flyback diodes 53 and 54 connected in antiparallel to the semiconductor switching elements 51 and 52, and a capacitor 55 connected in parallel to the semiconductor switching elements 51 and 52 connected in series.

The semiconductor switching elements 51 and 52 and the flyback diodes 53 and 54 correspond to a semiconductor element of the present invention.

In FIG. 2(a), a collector terminal and an emitter terminal of the semiconductor switching element 52 are connected to output terminals of the converter cell 10.

In FIG. 2(b), a collector terminal and an emitter terminal of the semiconductor switching element 51 are connected to output terminals of the converter cell 10.

It is noted that as the semiconductor switching elements 51 and 52, a semiconductor switching element such as IGBT (Insulated-Gate Bipolar Transistor), GCT (Gate Commutated Turn-off thyristor), or MOSFET (Metal-Oxide-Semiconductor Field-Effect Transistor) is used.

The capacitor 55 is not limited to a capacitor, and may be an energy storing element such as an electrical double-layer capacitor.

Next, the operation of the converter cell 10 will be described.

In FIG. 2(a), when the semiconductor switching element 51 is turned on and the semiconductor switching element 52 is turned off, output voltage of the converter cell 10 becomes substantially equal to voltage of the capacitor 55, and when the semiconductor switching element 51 is turned off and the semiconductor switching element 52 is turned on, output voltage of the converter cell becomes substantially zero.

On the other hand, in FIG. 2(b), when the semiconductor switching element 51 is turned on and the semiconductor switching element 52 is turned off, output voltage of the converter cell becomes substantially zero, and when the semiconductor switching element 51 is turned off and the semiconductor switching element 52 is turned on, output voltage of the converter cell becomes substantially equal to voltage of the capacitor 55.

Figure 2:
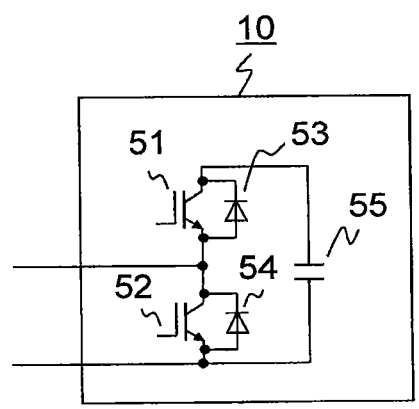
FIG. 2 is a circuit diagram of a converter cell according to the electrical power converter of embodiment 1 of the present invention.
Figure 2:
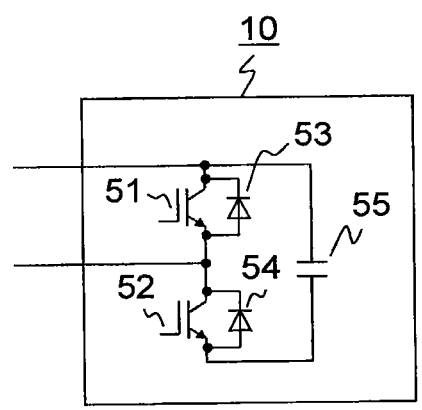

It is noted that although in FIG. 2, the case where output of the converter cell 10 is 2-level output is shown, 3-level output may be used. In this case, a multilevel configuration is achieved, which provides an effect of reducing harmonics or reducing the number of converter cells 10 connected in series.

Next, the operation and control of the electrical power converter 1 will be described.

For control of the electrical power converter 1, a known control method for MMC (Modular Multilevel Converter) may be applied. For example, "PWM Control of Modular Multilevel Converters" described in non-Patent Document 2 may be applied.

Each converter cell 10 outputs AC-component voltage and DC-component voltage by turning on or off the semiconductor switching elements 51 and 52. The AC voltage component is used for transfer of power to or from a power supply or a device connected to the AC voltage terminals U, V, and W. At this time, the average of voltage occurring on the AC voltage terminals U, V, and W per switching cycle is given as a voltage instruction, as in general PWM control for electrical power converter.

Figure 3:
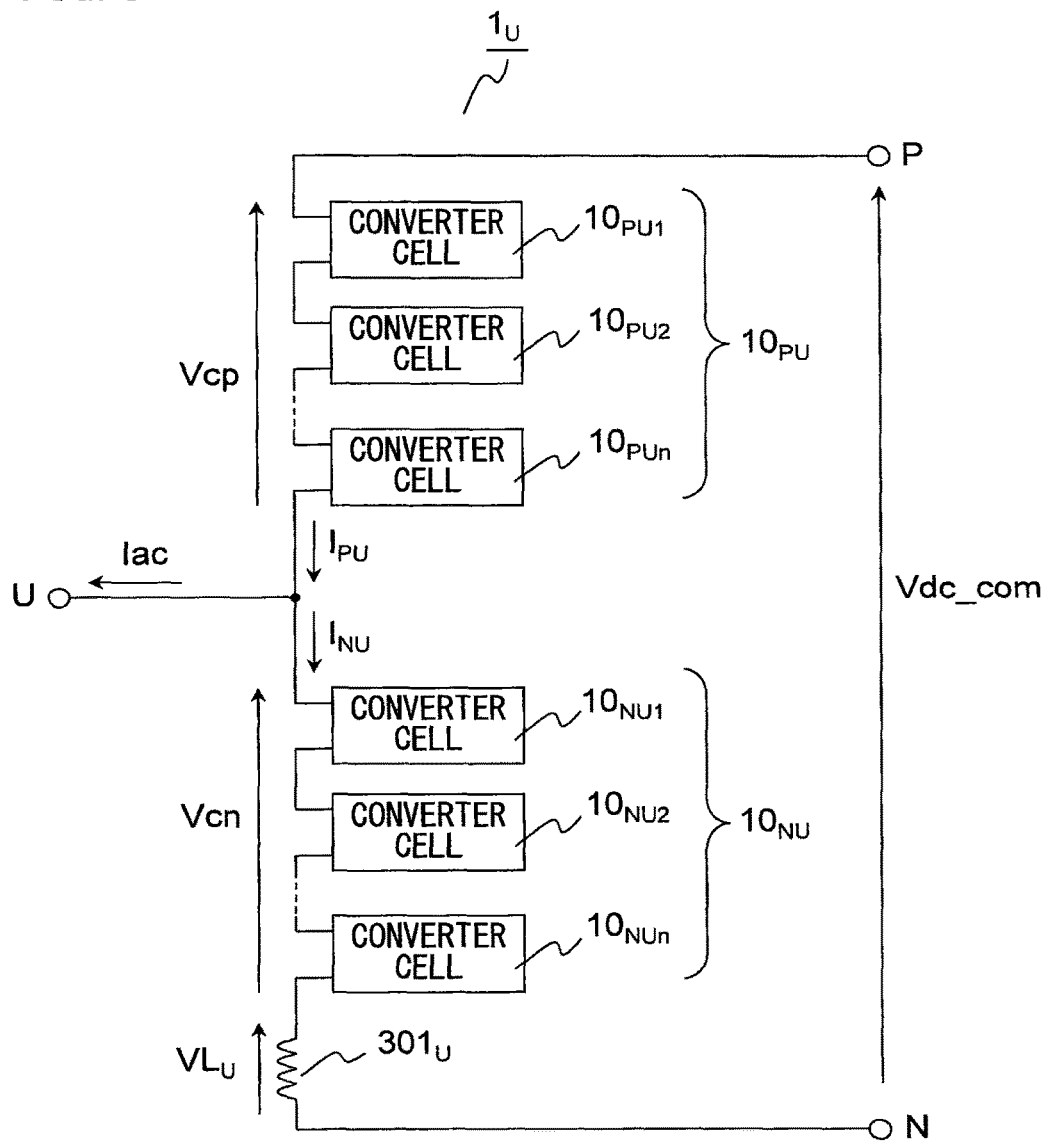
FIG. 3 is a diagram for explaining current and voltage for one phase in the main circuit according to the electrical power converter of embodiment 1 of the present invention.

FIG. 3 is a diagram showing current and voltage for U phase as an example of the one phase of the main circuit, for explaining the operation of the electrical power converter 1.

Current flowing to the AC voltage terminal U is denoted by Iac, current flowing in the converter cell series unit $10_{PU}$ of the converter cells $10_{PU1}$, $10_{PU2}$, ... $10_{PUn}$ at the positive side is denoted by $I_{PU}$, and current flowing in the converter cell series unit $10_{NU}$ of the converter cells $10_{NU1}$, $10_{NU2}$, ..., $10_{NUn}$ at the negative side is denoted by $I_{NU}$. In addition, voltage outputted by the converter cell series unit $10_{PU}$ of the converter cells $10_{PU1}$, $10_{PU2}$, ..., $10_{PUn}$ at the positive side is denoted by Vcp, voltage outputted by the converter cell is cell series unit $10_{NU}$ of the converter cells $10_{NU1}$, $10_{NU2}$, ..., $10_{NUn}$ at the negative side is denoted by Vcn, terminal voltage of the reactor $301_U$ is denoted by $VL_U$, and voltage between a positive pole P and a negative pole N is denoted by Vdc_com.

In this case, the current Iac flowing at the AC voltage terminal in FIG. 3 has substantially only an AC component, and if an AC voltage component of the voltage Vcp outputted by the positive-side converter cell series unit $10_{PU}$ and an AC voltage component of the voltage Vcn outputted by the negative-side converter cell series unit $10_{NU}$ form symmetrical waveforms having opposite polarities, the current Iac flows so as to be divided substantially in half to the positive side and the negative side. That is, an AC component of the current $I_{PU}$ flowing in the positive-side converter cell series unit $10_{PU}$ and an AC component of the current $I_{NU}$ flowing in the negative-side converter cell series unit $10_{NU}$ have opposite polarities and substantially the same magnitude.

It is noted that DC voltage components outputted by the converter cell series units $10_{PU}$ and $10_{NU}$ are zero-phase voltages which are substantially the same among the three phases, and therefore no DC voltage component occurs in line-to-line voltage among the AC voltage terminals U, V, and W, so that substantially no DC current flows at the AC voltage terminals U, V, and W.

It is noted that, in the case where a power supply is connected to the AC voltage terminals U, V, and W, a transformer or the like having a reactor or a leaked inductance is connected to control current flowing at the AC voltage terminals U, V, and W.

On the other hand, the DC voltage component is used for transfer of power to or from a power supply or a device connected to the DC voltage terminals P and N. On the DC voltage terminals P and N, an AC voltage component hardly occurs because the AC voltage component is cancelled between the positive-side converter cells and the negative-side converter cells.

DC current flowing in each converter cell 10 is controlled so that voltage of the capacitor 55 included in the converter cell 10 as shown in FIG. 2 is adjusted to be substantially constant. In other words, control is performed so as to flow DC current so that power transferred with the AC component of the converter cell 10 and power transferred with the DC component of the converter cell 10 are cancelled by each other.

Here, the DC current flows through a route of DC voltage terminal P→positive-side converter cell series unit→negative-side converter cell series unit→reactor 301→DC voltage terminal N. As a specific example, regarding the AC voltage terminal U, the DC current flows through a route of DC voltage terminal P→positive-side converter cell series unit $10_{PU}$→negative-side converter cell series unit $10_{NU}$→reactor $301_U$→DC voltage terminal N.

Thus, in order to control the DC current, it is only necessary to provide at least one reactor or inductance component on the route through which the DC current flows. Therefore, reactors or inductance components are not necessarily needed at both of the positive side and the negative side as in the electrical power converters disclosed in non-Patent Documents 2 and 3. That is, as in the electrical power converter 1 of present embodiment 1, the DC current control can be performed by only the negative-side reactor 301.

As described above, in the electrical power converter 1 of embodiment 1, since a reactor is provided at the negative side, the number of reactors can be reduced, whereby an electrical power converter compact in size and light in weight can be realized.

Figure 4:
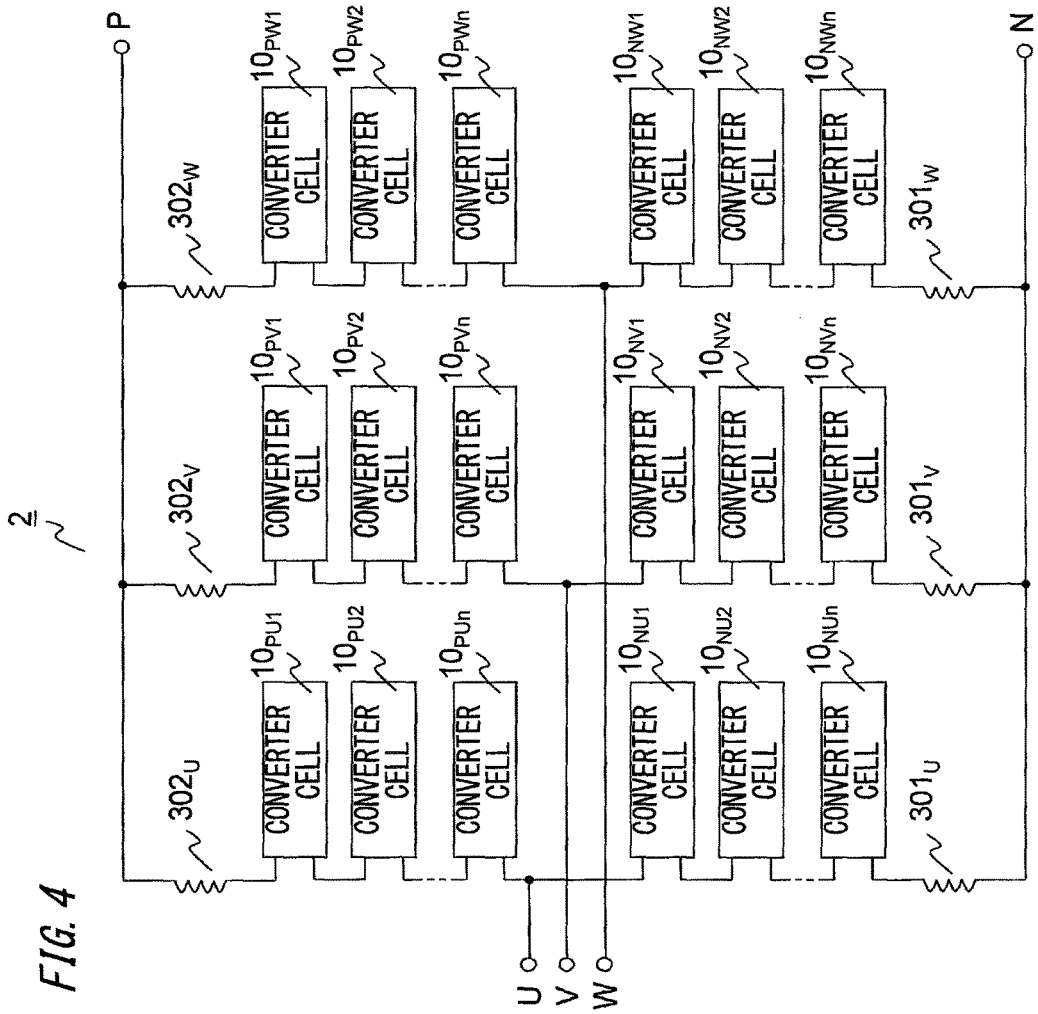
FIG. 4 is a main circuit configuration diagram in another example according to the electrical power converter of embodiment 1 of the present invention.

In the electrical power converter 1, the reactor 301 as an inductance is provided only at the negative side. However, even if an inductance component (for example, an anode reactor when GCT is applied) for protecting a semiconductor element or a small inductance such as wiring existing at the positive side, the effect of the present invention is not affected. That is, the effect of the present invention is obtained as long as the inductance value of an inductance at the negative side is greater than the inductance value of an inductance at the positive side. FIG. 4 shows a main circuit configuration diagram in which a reactor 302 which is a small inductance such as wiring added at the positive side in the electrical power converter 1. Like the reactor 301, the reactor 302 is a collective term for 302$_U$, 302$_V$, and 302$_W$.

For discrimination from the electrical power converter 1 in FIG. 1, the electrical power converter in this case is referred to as an electrical power converter 2. In addition, the reactor 302 corresponds to a second inductance of the present invention.

Next, an electrical power converter 3 in another example of embodiment 1 will be described based on FIG. 5.

Figure 5:
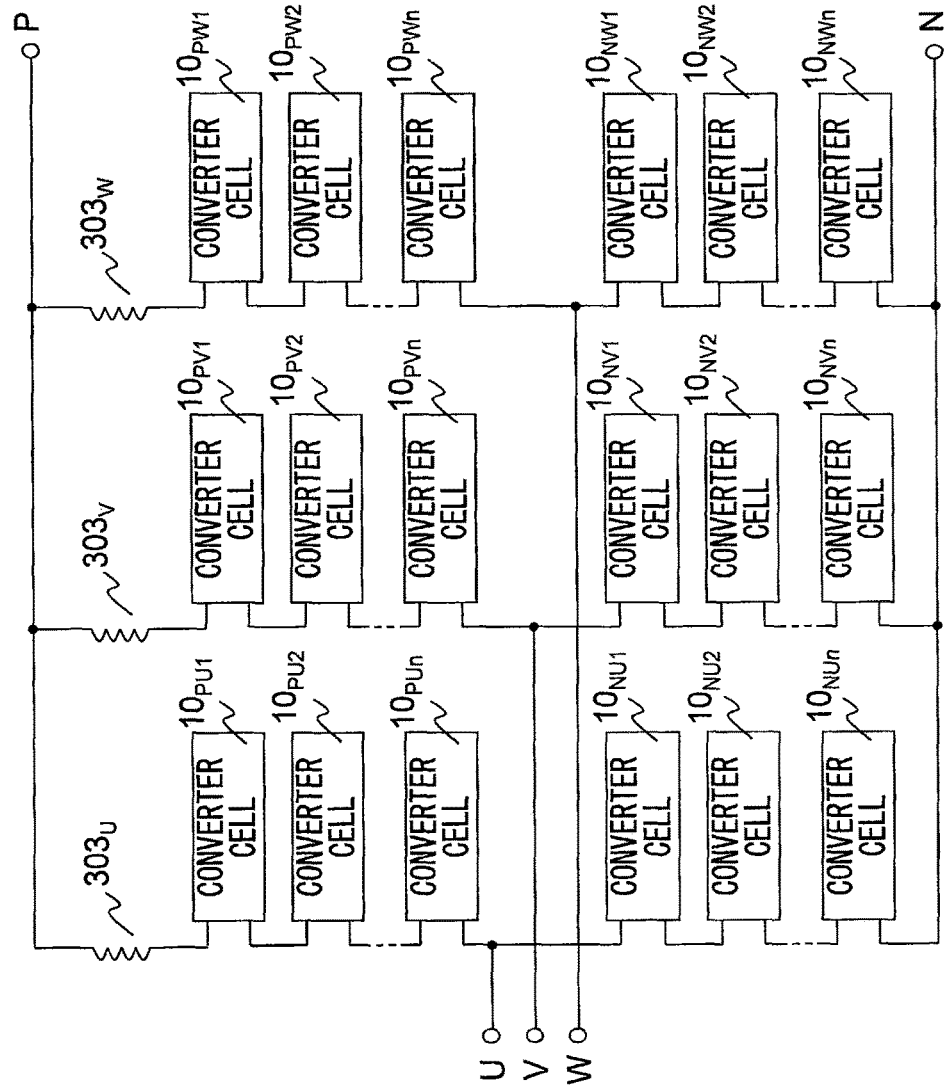
FIG. 5 is a main circuit configuration diagram in another example according to the electrical power converter of embodiment 1 of the present invention.

In FIG. 5, components that are the same or correspond to those in FIG. 1 are denoted by the same reference characters.

In the electrical power converter 3 in FIG. 5, a reactor 303 is provided at the positive side instead of the reactor 301 provided at the negative side in the above-described electrical power converter 1 in FIG. 1. That is, the difference of the configuration of the electrical power converter 3 from the configuration of the electrical power converter 1 is locations of the reactors, and the other configurations such as the converter cells and the converter cell series units are the same.

Here, for example, a reactor provided between the converter cell series unit 10$_{PU}$ and the DC voltage terminal P, between the AC voltage terminal U and the DC voltage terminal P, is referred to as a reactor 303$_U$.

It is noted that in the electrical power converter 3, it is assumed that the DC voltage terminal P is connected to the ground potential or set at a potential closer to the ground potential than the DC voltage terminal N is.

Since the only difference of the electrical power converter 3 from the electrical power converter 1 is locations of reactors and its operation is the same as that of the electrical power converter 1, the description thereof is omitted.

In the electrical power converter 3, since a reactor is provided at the positive side, the number of reactors can be reduced, whereby an electrical power converter compact in size and light in weight can be realized.

In the electrical power converter 3, the reactor 303 as an inductance is provided only at the positive side. However, even if an inductance component for protecting a semiconductor element or a small inductance such as wiring existing at the negative side, the effect of the present invention is not affected. That is, the effect of the present invention is obtained as long as the inductance value of an inductance at the positive side is greater than the inductance value of an inductance at the negative side.

Next, an electrical power converter 4 in another example of embodiment 1 will be described based on FIG. 6 and FIG. 8(*a*).

Figure 6:
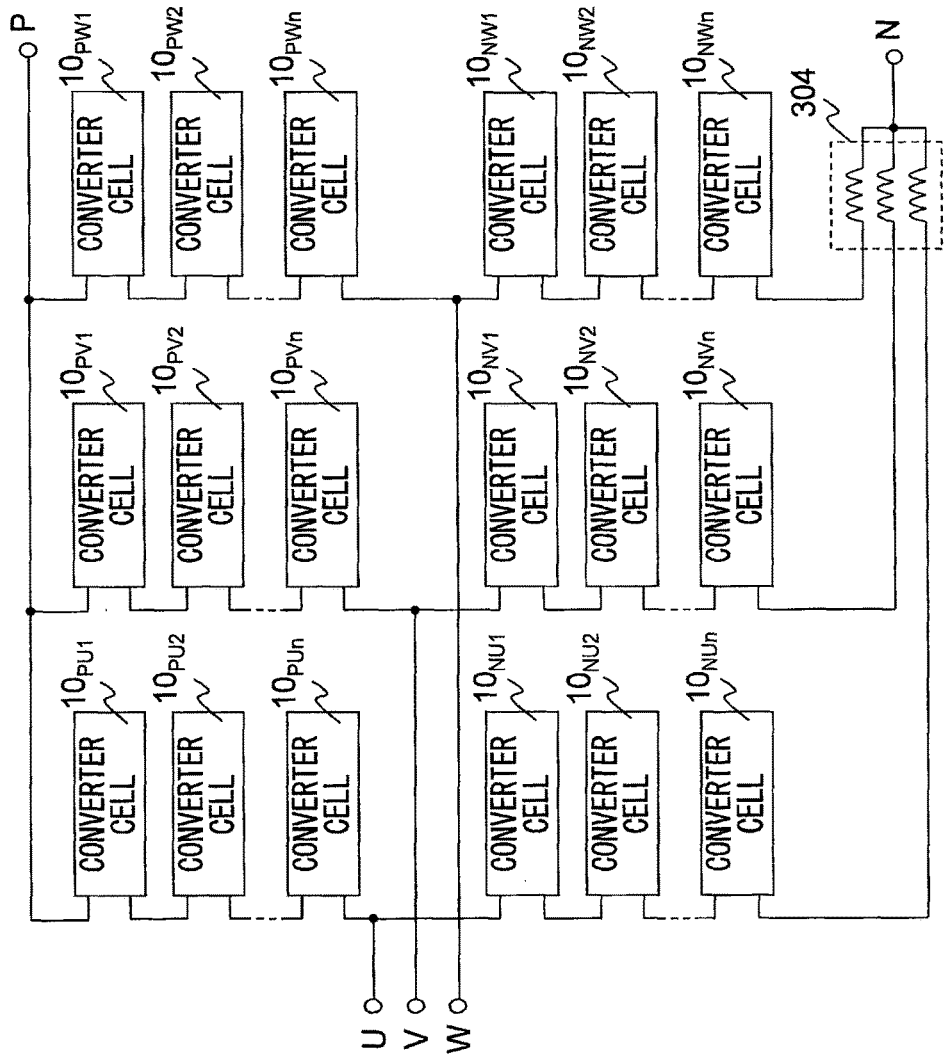
FIG. 6 is a main circuit configuration diagram in another example according to the electrical power converter of embodiment 1 of the present invention.

In FIG. 6, components that are the same or correspond to those in FIG. 1 are denoted by the same reference characters.

In the electrical power converter 4 in FIG. 6, one reactor 304 is provided which is obtained by magnetically coupling the three reactors 301$_U$, 301$_V$, and 301$_W$ provided for respective phases at the negative side in the electrical power converter 1 in FIG. 1.

Figure 8:
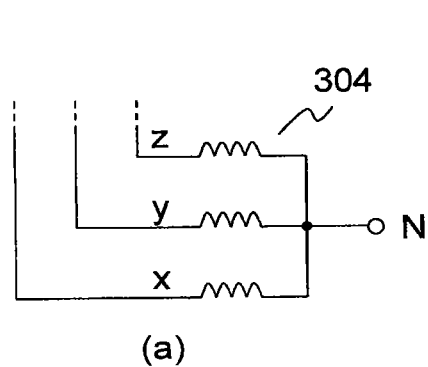
FIG. 8 is a circuit diagram of a reactor according to the electrical power converter of embodiment 1 of the present invention.
Figure 8:
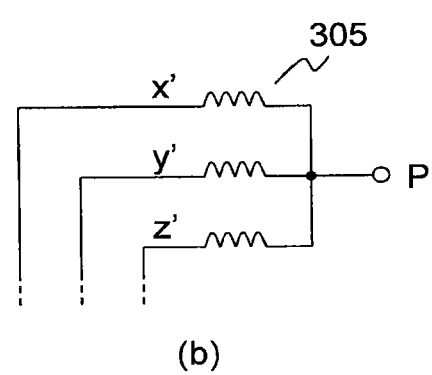

In FIG. 8(*a*), an end x of the reactor 304 is connected to the converter cell series unit 10$_{NU}$, an end y of the reactor 304 is connected to the converter cell series unit 10$_{NV}$, an end z of the reactor 304 is connected to the converter cell series unit 10$_{NW}$. In the reactor 304, an x-N winding, a y-N winding, and a z-N winding are magnetically coupled.

In the electrical power converter 4, since a magnetic flux due to current flowing in each phase is reduced in the reactor 304, an effect of downsizing the reactor is obtained, and the reactor is further downsized as compared to the case of forming one unit of reactor structurally. Therefore, it is possible to realize an electrical power converter with the size and weight further reduced as compared to the electrical power converter 1.

Next, an electrical power converter 5 in another example of embodiment 1 will be described based on FIG. 7 and FIG. 8(*b*).

Figure 7:
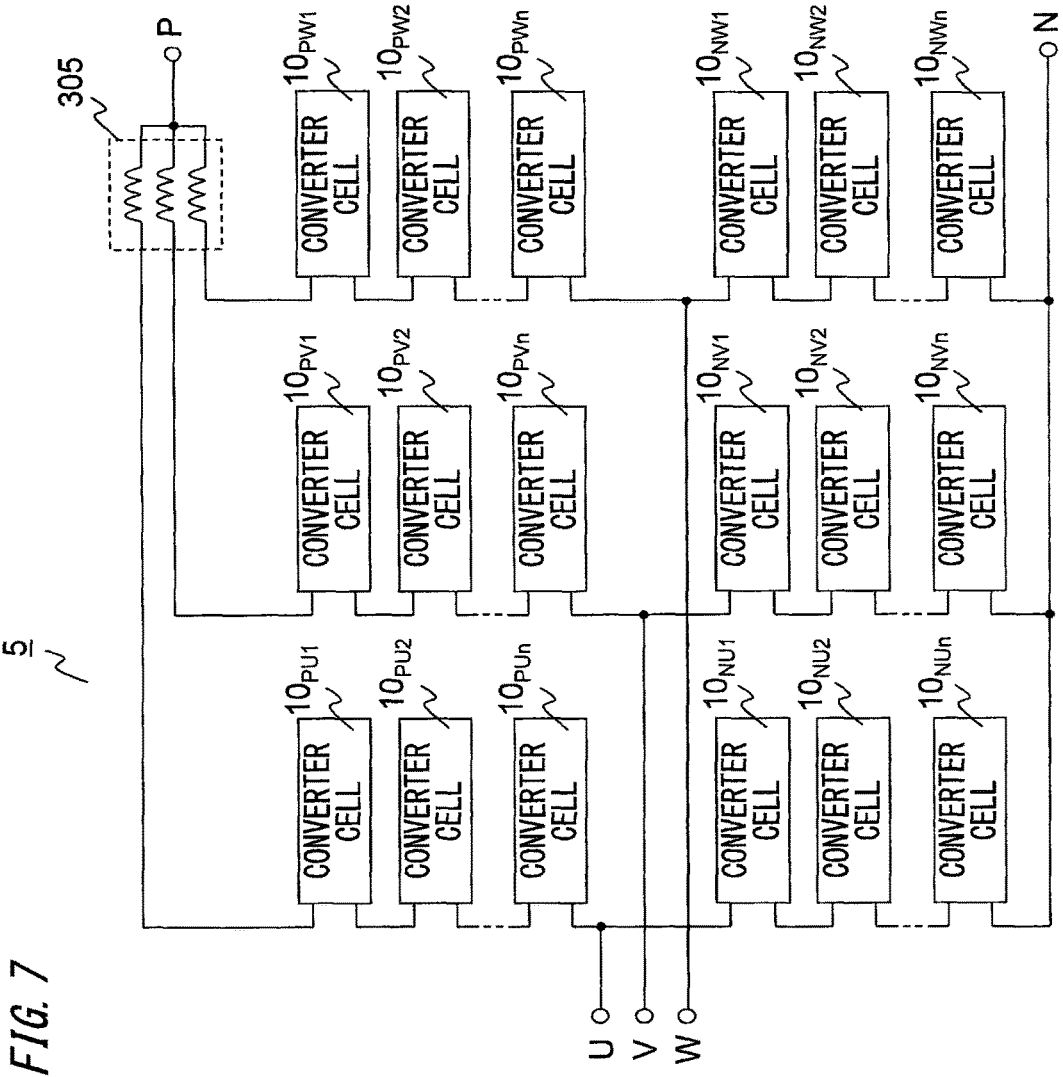
FIG. 7 is a main circuit configuration diagram in another example according to the electrical power converter of embodiment 1 of the present invention.

In FIG. 7, components that are the same or correspond to those in FIG. 1 and FIG. 5 are denoted by the same reference characters.

In the electrical power converter 5 in FIG. 7, one reactor 305 is provided which is obtained by magnetically coupling the three reactors 303$_U$, 303$_V$, and 303$_W$ provided for respective phases at the positive side in the electrical power converter 3 in FIG. 5.

In FIG. 8(*b*), an end x' of the reactor 305 is connected to the converter cell series unit 10$_{PU}$, an end y' of the reactor 305 is connected to the converter cell series unit 10$_{PV}$, an end z' of the reactor 305 is connected to the converter cell series unit 10$_{PW}$. In the reactor 305, an x'-P winding, a y'-P winding, and a z'-P winding are magnetically coupled.

In the electrical power converter 5, since a magnetic flux due to current flowing in each phase is reduced in the reactor 305, an effect of downsizing the reactor is obtained, and the reactor is further downsized as compared to the case of forming one reactor structurally. Therefore, it is possible to realize an electrical power converter with the size and weight further reduced as compared to the electrical power converter 3.

Generally, a reactor used in an electrical power converter with high voltage and large capacity is as heavy as several tons. Therefore, in the case of using an insulator or the like for insulation, it is difficult to ensure earthquake resistance.

In the electrical power converter 1 and the electrical power converter 4, the DC voltage terminal N at the side where a reactor is provided is connected to the ground or set at a potential closer to the ground potential than the other DC voltage terminal P is, whereby insulation of the reactor is facilitated, and it becomes easy to downsize an insulating member and ensure earthquake resistance.

Also in the electrical power converter 3 and the electrical power converter 5, the DC voltage terminal P at the side where a reactor is provided is connected to the ground or set at a potential closer to the ground potential than the other DC voltage terminal N is, whereby insulation of the reactor is facilitated, and it becomes easy to downsize an insulating member and ensure earthquake resistance.

As described above, the electrical power converter according to embodiment 1 has a configuration in which one or more converter cells each composed of semiconductor elements and a capacitor are connected in series between the three-phase AC voltage terminals and the DC voltage terminals (P, N), and further, a reactor is connected in series to each converter cell series unit, between a DC voltage terminal at the lowest potential with respect to the ground, and the AC voltage terminals. Therefore, the reactor can be downsized, and since the reactor is placed close to the ground potential, insulation voltage can also be reduced, whereby insulation is facilitated, and earthquake resistance can be improved. Further, an effect of improving durability and saving energy is obtained.

It is noted that, although in embodiment 1, the AC voltage terminals and the DC voltage terminals have been described as substantial terminals, they may be understood as an AC input/output section and a DC input/output section.

In addition, although in embodiment 1, the case where the AC voltage is three-phase AC voltage has been described, single-phase AC voltage or AC voltages for four or more phases may be used.

Embodiment 2

An electrical power converter of embodiment 2 includes two of the electrical power converters of embodiment 1 (for example, the electrical power converter 1 and the electrical power converter 3), with their AC voltage terminals connected in parallel via a transformer, and with their DC voltage terminals connected in series.

Hereinafter, the configuration and operation of the electrical power converter of embodiment 2 will be described based on FIGS. 9 and 10 which are a main circuit configuration diagram of the electrical power converter, FIGS. 11 and 12 to FIGS. 15 and 16 which are main circuit configuration diagrams in other examples, and FIG. 17 which is a circuit diagram of a reactor.

Figure 9:
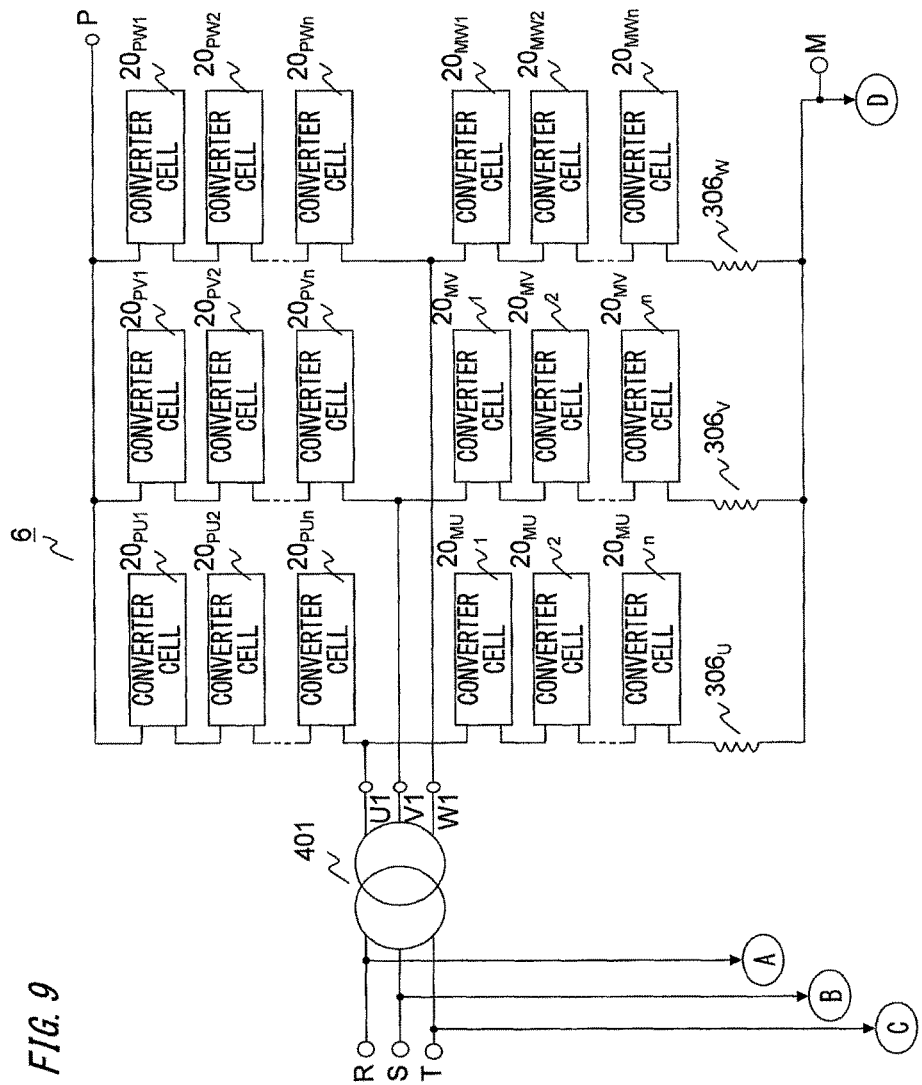
FIG. 9 is a main circuit configuration diagram according to an electrical power converter of embodiment 2 of the present invention.
Figure 10:
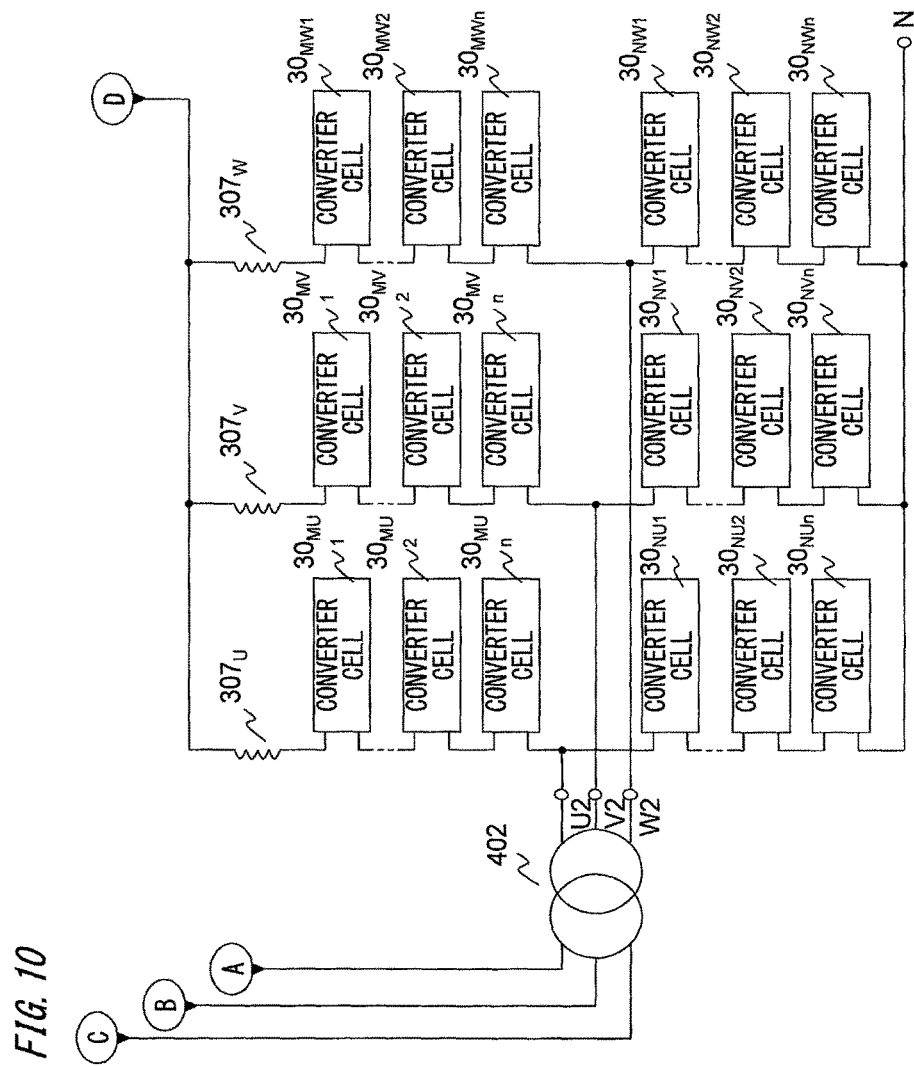
FIG. 10 is the main circuit configuration diagram according to the electrical power converter of embodiment 2 of the present invention.
Figure 11:
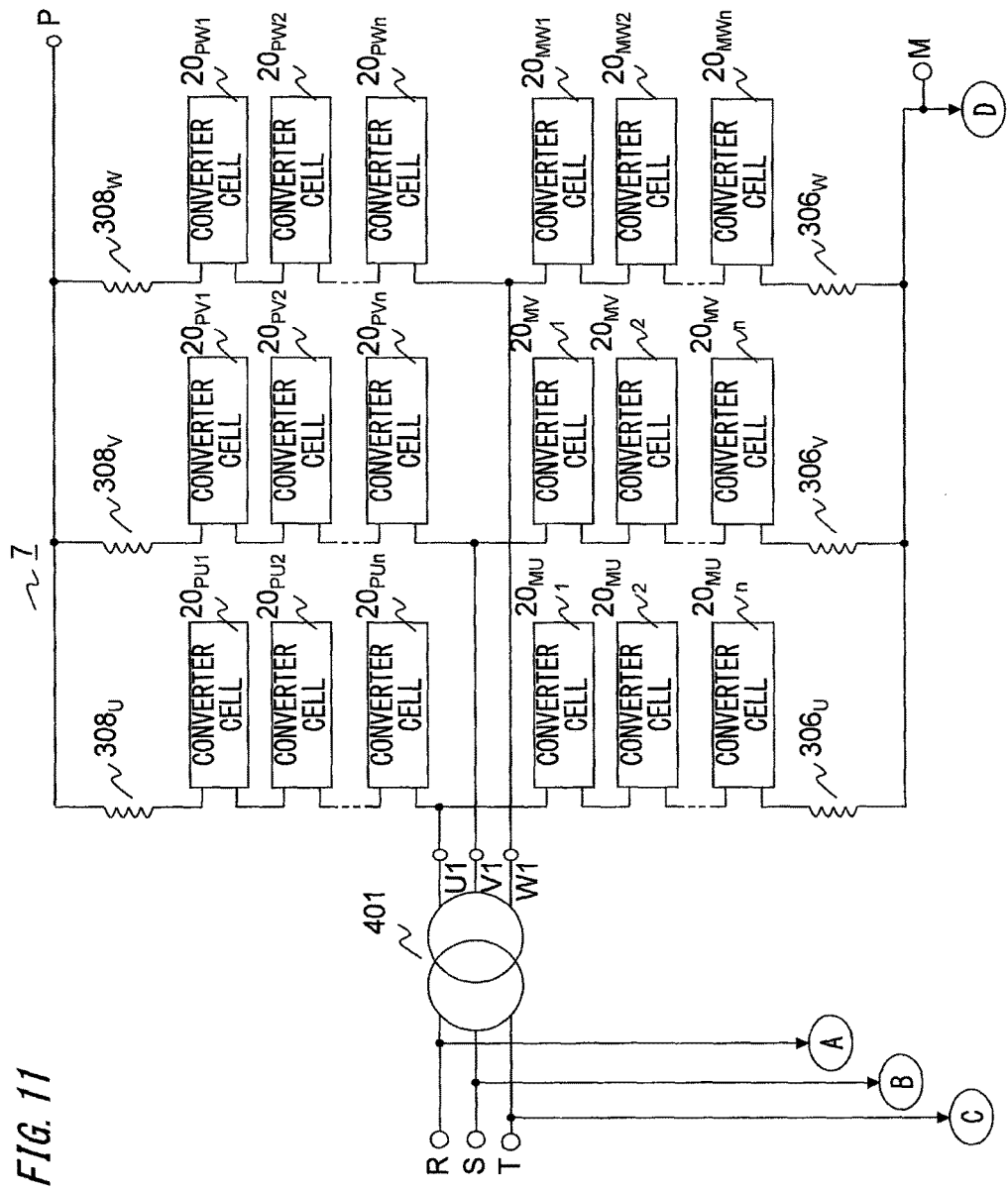
FIG. 11 is a main circuit configuration diagram in another example according to the electrical power converter of embodiment 2 of the present invention.
Figure 12:
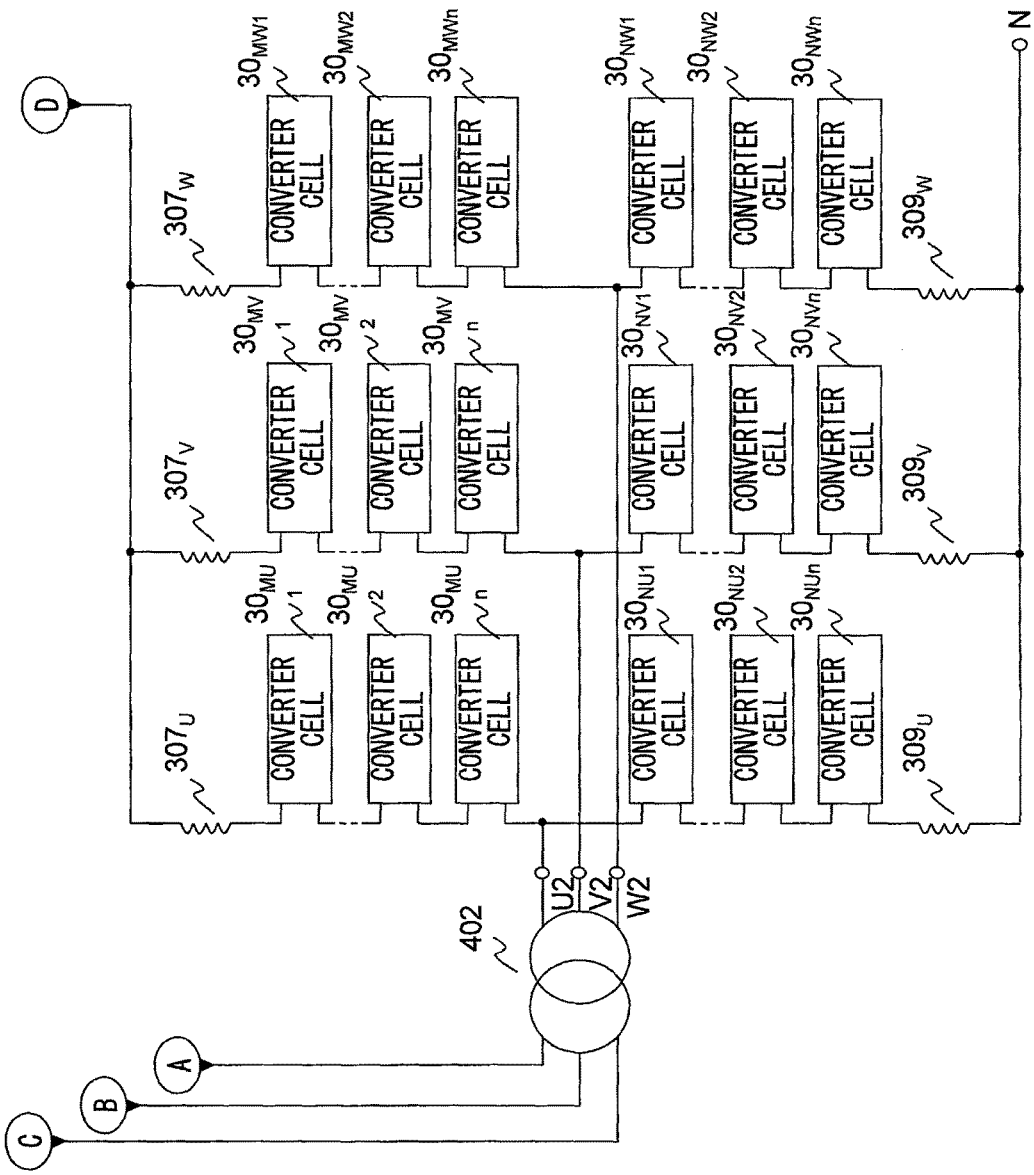
FIG. 12 is the main circuit configuration diagram in another example according to the electrical power converter of embodiment 2 of the present invention.
Figure 13:
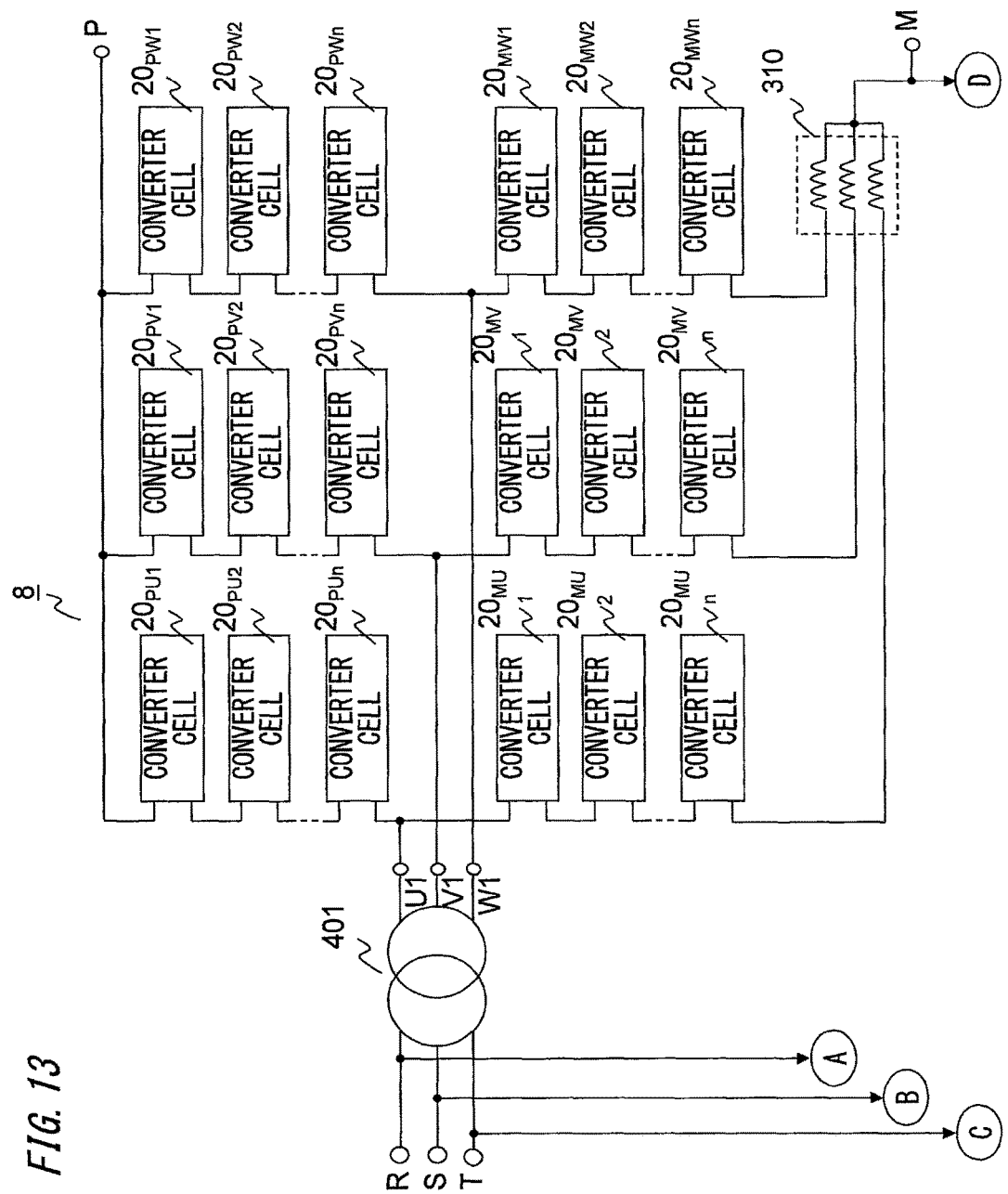
FIG. 13 is a main circuit configuration diagram in another example according to the electrical power converter of embodiment 2 of the present invention.
Figure 14:
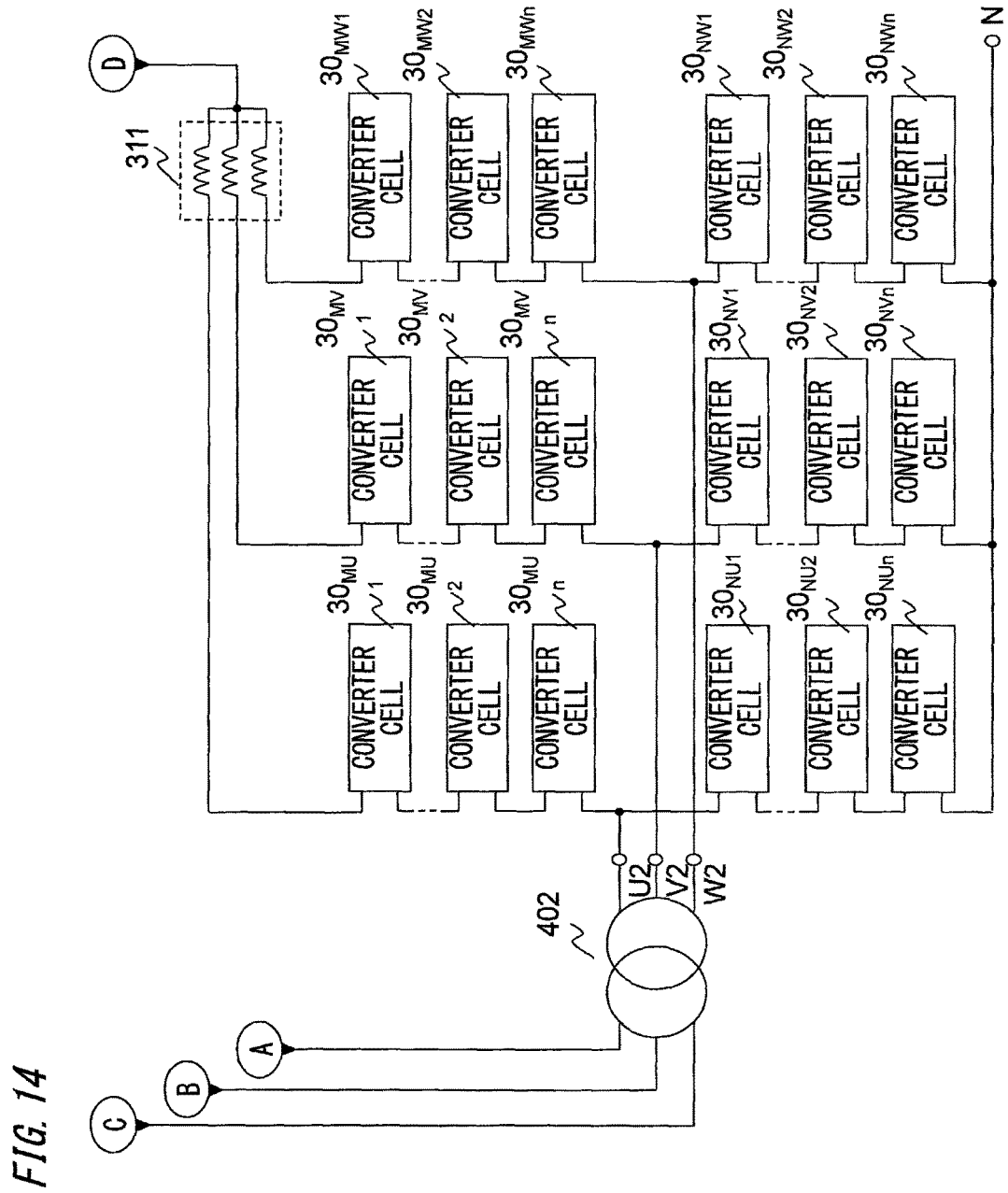
FIG. 14 is the main circuit configuration diagram in another example according to the electrical power converter of embodiment 2 of the present invention.
Figure 15:
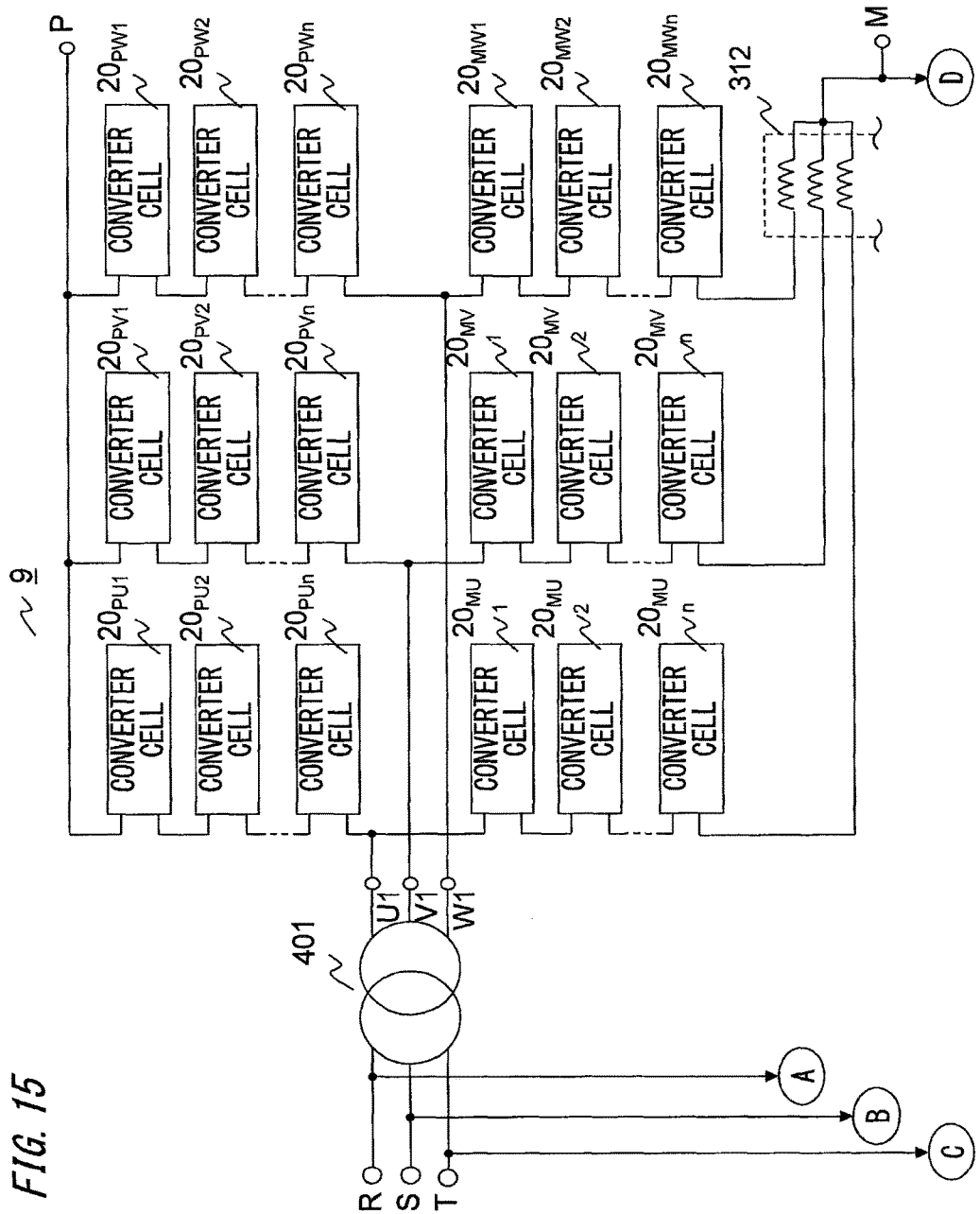
FIG. 15 is a main circuit configuration diagram in another example according to the electrical power converter of embodiment 2 of the present invention.
Figure 16:
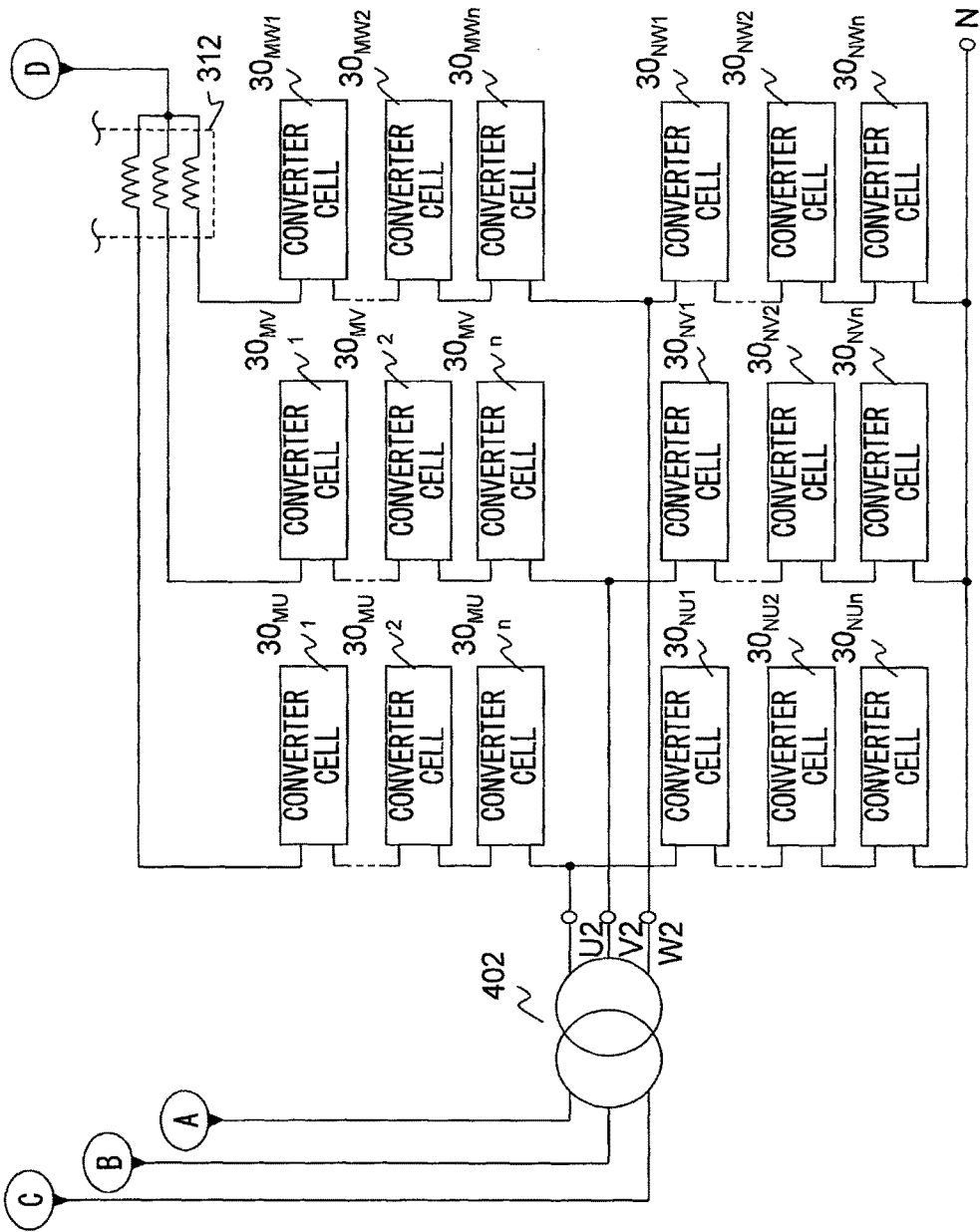
FIG. 16 is the main circuit configuration diagram in another example according to the electrical power converter of embodiment 2 of the present invention.

FIGS. 9 and 10 show the main circuit configuration of an electrical power converter 6 described below. In addition, FIGS. 11 and 12 show the main circuit configuration of an electrical power converter 7, FIGS. 13 and 14 show the main circuit configuration of an electrical power converter 8, and FIGS. 15 and 16 show the main circuit configuration of an electrical power converter 8.

First, the configuration and operation of the electrical power converter 6 of embodiment 2 will be described based on FIGS. 9 and 10. In FIGS. 9 and 10, components that are the same or correspond to those in FIG. 1 and FIG. 5 are denoted by the same reference characters.

Between each of AC voltage terminals U1, V1, and W1 and each of DC voltage terminals P and M in the electrical power converter 6, for example, regarding the AC voltage terminal U1, converter cell series units of one or more (1 to n) converter cells $20_{PU}$ connected in series and one or more (1 to n) converter cells $20_{MU}$ connected in series are provided. In addition, a reactor 306 is provided between each of the AC voltage terminals U1, V1, and W1 and a DC voltage terminal M. The reactor 306 is a collective term for $306_U$, $306_V$, and $306_W$. This configuration between the AC voltage terminals U1, V1, and W1 and the DC voltage terminals P and M is the same as in the electrical power converter 1.

It is noted that, although the configuration and operation of the converter cells are the same, for facilitating explanation and understanding, in the electrical power converter 5, the converter cells are referred to as converter cells 20 instead of converter cells 10 in the electrical power converter 1. In addition, in the electrical power converter 5, the reactor is referred to as a reactor 306 instead of the reactor 301 in the electrical power converter 1.

On the other hand, between each of AC voltage terminals U2, V2, and W2 and each of DC voltage terminals M and N in the electrical power converter 6, for example, regarding the AC voltage terminal U2, converter cell series units of one or more (1 to n) converter cells $30_{MU}$ connected in series and one or more (1 to n) converter cells $30_{NU}$ connected in series are provided. In addition, a reactor 307 is provided between each of the AC voltage terminals U2, V2, and W2 and the DC voltage terminal M. The reactor 307 is a collective term for $307_U$, $307_V$, and $307_W$. This configuration between the AC voltage terminals U2, V2, and W2 and the DC voltage terminals M and N is the same as in the electrical power converter 3.

It is noted that, although the configuration and operation of the converter cells are the same, for facilitating explanation and understanding, in the electrical power converter 6, the converter cells are referred to as converter cells 30 instead of converter cells 10 in the electrical power converter 3. In addition, in the electrical power converter 6, the reactor is referred to as a reactor 307 instead of the reactor 303 in the electrical power converter 3.

It is noted that the reactor 306 corresponds to a third inductance of the present invention, and the reactor 307 corresponds to a fourth inductance of the present invention.

The AC voltage terminals U1, V1, and W1 are connected to AC voltage terminals R, S, and T via a transformer 401. The AC voltage terminals U2, V2, and W2 are connected to the AC voltage terminals R, S, and T via a transformer 402.

The DC voltage terminal N of the electrical power converter 1 is connected to the DC voltage terminal P of the electrical power converter 3, and forms a neutral point M. That is, the reactors 306 and 307 are provided at the neutral point M side.

In the electrical power converter 6 of embodiment 2, the electrical power converter 1 and the electrical power converter 3 are combined via the transformers 401 and 402, and are connected to the AC voltage terminals R, S, and T via the transformers 401 and 402. And control for the converter cells in the main circuit, that is, control for the semiconductor switching elements in the converter cells can be performed in the same manner as in embodiment 1.

It is noted that, if the transformers 401 and 402 have leaked inductance, an AC power supply can be connected to the AC voltage terminals R, S, and T.

The electrical power converter 6 can function as an electrical power converter having a bipolar configuration at the DC side. That is, for example, in the case of application to DC transmission at ±500 kV, the DC voltage terminal P corresponds to +500 kV and the DC voltage terminal N corresponds to −500 kV. The neutral point M may be connected to the ground, or instead of grounding the neutral point M, a substantially intermediate potential between the DC voltage terminals P and N may be connected to the ground by voltage division using a capacitor.

In either case, the neutral point M becomes substantially equal to the ground potential. Therefore, in the electrical power converter 6, the number of reactors can be reduced, and in addition, since the potential at which the reactors are provided is close to the ground potential, insulation is facilitated, and thus an electrical power converter being compact in size and light in weight and having improved earthquake resistance can be realized.

As described above, in the electrical power converter 6 of embodiment 2, since the reactors are provided at the neutral point M side, the number of reactors can be reduced, whereby an electrical power converter compact in size and light in weight can be realized.

In the electrical power converter 6, the reactors 306 and 307 as an inductance are provided only at the neutral point M side. However, even if an inductance component for protecting a semiconductor element or a small inductance such as wiring existing at the positive side and/or the negative side, the effect of the present invention is not affected. That is, the effect of the present invention is obtained as long as the inductance value of an inductance at the neutral point M side is greater than the inductance value of an inductance at the positive side or the negative side.

FIGS. 11 and 12 show main circuit configuration diagrams in which a reactor 308 which is a small inductance such as wiring added at the positive side, and a reactor 309 which is a small inductance such as wiring added at the negative side, in the electrical power converter 6. It is noted that the reactor 308 is a collective term for $308_U$, $308_V$, and $308_W$ and the reactor 309 is a collective term for $309_U$, $309_V$, and $309_W$.

For discrimination from the electrical power converter 6 in FIGS. 9 and 10, the electrical power converter in this case is referred to as an electrical power converter 7. In addition, the reactor 308 corresponds to a fifth inductance of the present invention, and the reactor 309 corresponds to a sixth inductance of the present invention.

Next, an electrical power converter 8 in another example of embodiment 2 will be described based on FIGS. 13 and 14.

In FIGS. 13 and 14, components that are the same or correspond to those in FIGS. 9 and 10 are denoted by the same reference characters.

In the electrical power converter 8 in FIGS. 13 and 14, one reactor 310 is provided which is obtained by magnetically coupling the three reactors $306_U$, $306_V$, and $306_W$ provided for respective phases at the neutral point side in the electrical power converter 6 in FIGS. 9 and 10, and similarly, one reactor 311 is provided which is obtained by magnetically coupling the three reactors $307_U$, $307_V$, and $307_W$ provided for respective phases at the neutral point side.

Here, the reactor 310 of the electrical power converter 8 is the same as the reactor 304 of the electrical power converter 4 in FIG. 6, and the reactor 311 of the electrical power converter 8 is the same as the reactor 305 of the electrical power converter 5 in FIG. 7.

In the electrical power converter 8, since a magnetic flux due to current flowing in each phase is reduced in the reactors 310 and 311, an effect of downsizing the reactor is obtained, and the reactor is further downsized as compared to the case of providing each reactor as one unit structurally. Therefore, it is possible to realize an electrical power converter with the size and weight further reduced as compared to the electrical power converter 6.

Next, an electrical power converter 9 in another example of embodiment 2 will be described based on FIGS. 15, 16, and 17.

In FIGS. 15 and 16, components that are the same or correspond to those in FIGS. 9 and 10 are denoted by the same reference characters.

In the electrical power converter 9 in FIGS. 15 and 16, one reactor 312 is provided which is obtained by unifying a total of six reactors $306_U$, $306_V$, $306_W$, $307_U$, $307_V$, and $307_W$ provided at the neutral point side in the electrical power converter 6 in FIGS. 9 and 10.

Figure 17:
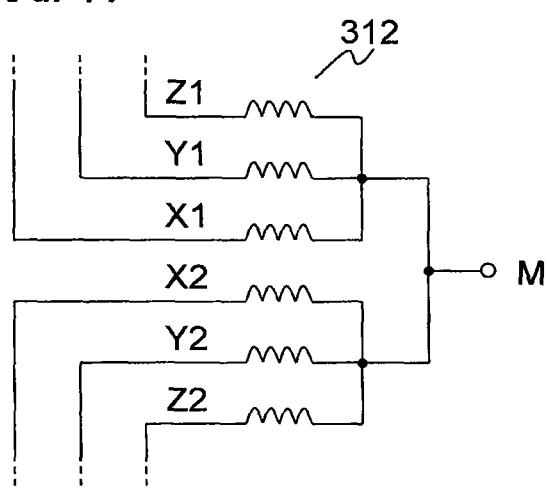
FIG. 17 is a circuit diagram of a reactor according to the electrical power converter of embodiment 2 of the present invention.

In FIG. 17, an end X1 of the reactor is connected to the converter cell series unit $20_{MU}$, an end Y1 is connected to the converter cell series unit $20_{MV}$, and an end Z1 is connected to the converter cell series unit $20_{MU}$. In addition, an end X2 of the reactor 312 is connected to the converter cell series unit $30_{MU}$, an end Y2 is connected to the converter cell series unit $30_{MV}$, and an end Z2 is connected to the converter cell series unit $30_{MW}$.

In the reactor 312, an X1-M winding, a Y1-M winding, a Z1-M winding, an X2-M winding, a Y2-M winding, and a Z2-M winding are magnetically coupled.

In the electrical power converter 9, since a magnetic flux due to current flowing in each phase is reduced in the reactor 312, an effect of downsizing the reactor is obtained, and the reactor is further downsized as compared to the case of forming one reactor structurally. Therefore, it is possible to realize an electrical power converter with the size and weight further reduced as compared to the electrical power converter 6.

It is noted that although in the electrical power converter 9, all of the X1-M winding, the Y1-M winding, the Z1-M winding, the X2-M winding, the Y2-M winding, and the Z2-M winding in the reactor 312 are magnetically coupled, only an inductance at the positive side and an inductance at the negative side may be magnetically coupled via the neutral point.

Specifically, in the reactor 312, X1-M, Y1-M, and Z1-M may not be magnetically connected, and X2-M, Y2-M, and Z2-M may not be magnetically connected. Meanwhile, X1-M and X2-M may be magnetically connected, Y1-M and Y2-M may be magnetically connected, and Z1-M and Z2-M may be magnetically connected.

As described above, the electrical power converter of embodiment 2 includes two of the electrical power converters of embodiment 1 (for example, the electrical power converter 1 and the electrical power converter 3), with their AC voltage terminals connected in parallel via a transformer, and with their DC voltage terminals connected in series. One or more converter cells are connected in series between the first AC voltage terminal and the positive voltage terminal, between the first AC voltage terminal and the neutral point, between the second AC voltage terminal and the neutral point, and between the second AC voltage terminal and the negative voltage terminal. Between each of the first and second AC voltage terminals and the neutral point, reactors are connected in series to the respective converter cell series units. Therefore, the reactor can be downsized, and since the reactors are placed close to the ground potential, insulation voltage can also be reduced, whereby insulation is facilitated, and earthquake resistance can be improved.

It is noted that, although in embodiment 2, the case where the AC voltage is three-phase AC voltage has been described, single-phase AC voltage or AC voltages for four or more phases may be used.

In embodiments 1 and 2, the case where the semiconductor switching elements and the flyback diode elements are made of silicon has been shown. However, they may be formed by a wide bandgap semiconductor which has a wider bandgap than silicon. Examples of a wide bandgap semiconductor include silicon carbide, gallium-nitride-based material, and diamond.

In the case of using a wide bandgap semiconductor, withstand voltage of a semiconductor element can be enhanced, whereby the number of converter cells connected in series can be reduced. Further, high-speed semiconductor switching can be performed, and therefore input current or output voltage having a reduced harmonic component can be obtained.

In the present invention relating to an electrical power converter, each embodiment may be modified or abbreviated as appropriate within the scope of the present invention.

INDUSTRIAL APPLICABILITY

The present invention relates to conversion from AC power to DC power or conversion from DC power to AC power, and is applicable to a wide range of electrical power converters.

The invention claimed is:
1. An electrical power converter comprising:
first AC voltage terminals;
second AC voltage terminals;
a positive DC voltage terminal;
a negative DC voltage terminal;

a neutral point between the positive and negative DC voltage terminals;

converter cell series units provided between the first AC voltage terminals and the positive DC voltage terminal, between the first AC voltage terminals and the neutral point, between the second AC voltage terminals and the neutral point, and between the second AC voltage terminals and the negative DC voltage terminal, each converter cell series unit composed of one or more converter cells connected in series, each converter cell including semiconductors elements connected in parallel with a capacitor;

a third inductance connected in series to the converter cell series unit located between the first AC voltage terminals and the neutral point, wherein the third inductance is a first reactor, not an inductance of wiring, the first reactor having a terminal directly connected to the neutral point;

a fourth inductance connected in series to the converter cell series unit located between the second AC voltage terminals and the neutral point, wherein the fourth inductance is a second reactor, not an inductance of wiring, the second reactor having a terminal directly connected to the neutral point;

a fifth inductance connected in series to the converter cell series unit located between the first AC voltage terminals and the positive DC voltage terminal, wherein the fifth inductance is inductance of wiring and has a smaller inductance value than the third inductance; and a sixth inductance connected in series to the converter cell series unit located between the second AC voltage terminals and the negative DC voltage terminal, wherein the sixth inductance is inductance of wiring and has a smaller inductance value than the fourth inductance, wherein inductances between the first AC voltage terminals and the positive DC voltage terminal, and between the second AC voltage terminals and the negative DC voltage terminal, are smaller than corresponding inductances between the first AC voltage terminals and the neutral point, and between the second AC voltage terminals and the neutral point.

2. The electrical power converter according to claim 1, the electrical power converter having a plurality of phases, wherein
the first AC voltage terminals, the second AC voltage terminals, the converter cell series units, the third inductance, and the fourth inductance are provided for the respective plurality of phases, and
the third inductance for the respective plurality of phases are magnetically coupled with each other, and the fourth inductance for the respective plurality of phases are magnetically coupled with each other.

3. The electrical power converter according to claim 1, wherein the first AC voltage terminals and the second AC voltage terminals are connected in parallel to each other via one or more transformers.

4. The electrical power converter according to claim 1, wherein the third inductance and the fourth inductance are magnetically coupled with each other via the neutral point.

5. The electrical power converter according to claim 1, wherein the neutral point is present at a potential closer to a ground than the AC voltage terminals and positive and the negative DC voltage terminals.

6. The electrical power converter according to claim 5, wherein the third inductance and the fourth inductance are magnetically coupled with each other via the neutral point.

7. The electrical power converter according to claim 1, wherein the semiconductor element included in each converter cell is formed by a wide bandgap semiconductor which has a wider bandgap than silicon.

8. The electrical power converter according to claim 7, wherein the wide bandgap semiconductor is silicon carbide, gallium-nitride-based material, or diamond.

* * * * *